United States Patent [19]

Haberkorn et al.

[11] Patent Number: 5,107,662
[45] Date of Patent: * Apr. 28, 1992

[54] MOWER

[75] Inventors: Jean-Paul Haberkorn; Horst Neuerburg, both of Saverne, France

[73] Assignee: Kuhn S.A., Saverne Cedex, France

[*] Notice: The portion of the term of this patent subsequent to Mar. 20, 2007 has been disclaimed.

[21] Appl. No.: 352,838

[22] Filed: May 15, 1989

Related U.S. Application Data

[63] Continuation of Ser. No. 177,835, Mar. 24, 1988, Pat. No. 4,909,023.

[30] Foreign Application Priority Data

Jul. 10, 1985 [FR] France .................. 85 10697
Nov. 22, 1985 [FR] France .................. 85 17425

[51] Int. Cl.⁵ .............................. A01D 34/66
[52] U.S. Cl. ............................. 56/13.6; 56/6
[58] Field of Search .............. 56/13.6, 6, 295

[56] References Cited

U.S. PATENT DOCUMENTS

| | | | |
|---|---|---|---|
| 4,253,294 | 3/1981 | Zaeegors | 56/13.6 |
| 4,283,905 | 8/1981 | Van der Lely | 56/13.6 |
| 4,314,436 | 2/1982 | Van der Lely | 56/13.6 |
| 4,549,390 | 10/1985 | McLean | 56/13.6 |
| 4,557,104 | 12/1985 | Toillie et al. | 56/13.6 |
| 4,653,253 | 3/1987 | Voler et al. | 56/13.6 |

FOREIGN PATENT DOCUMENTS

| | | |
|---|---|---|
| 2034450 | 2/1971 | Fed. Rep. of Germany . |
| 2423039 | 2/1974 | Fed. Rep. of Germany . |
| 2222415 | 11/1974 | Fed. Rep. of Germany . |
| 2838420 | 3/1979 | Fed. Rep. of Germany . |
| 0009134 | 8/1979 | Fed. Rep. of Germany . |
| 7204888 | 7/1973 | France . |
| 2358819 | 2/1978 | France . |
| 2454748 | 11/1980 | France . |
| 8319310 | 4/1984 | France . |
| 7307171 | 11/1974 | Netherlands . |
| 0118952 | 9/1984 | Netherlands . |
| 445929 | 10/1967 | Switzerland . |
| 2023393 | 1/1980 | United Kingdom . |

Primary Examiner—John G. Weiss
Attorney, Agent, or Firm—Oblon, Spivak, McClelland, Maier & Neustadt

[57] ABSTRACT

A mower having a frame that supports, by means of connecting elements, a cutting element equipped with cutting tools. A rotary drum extends in part at least above the rotary cutting element. A device for driving the rotary cutting element and or the rotary drum, and at least a part of the connecting elements penetrate inside the rotary drum by passing through its upper part. On the upper part of said rotary drum there is mounted a plurality of rotary push-back blades.

52 Claims, 8 Drawing Sheets

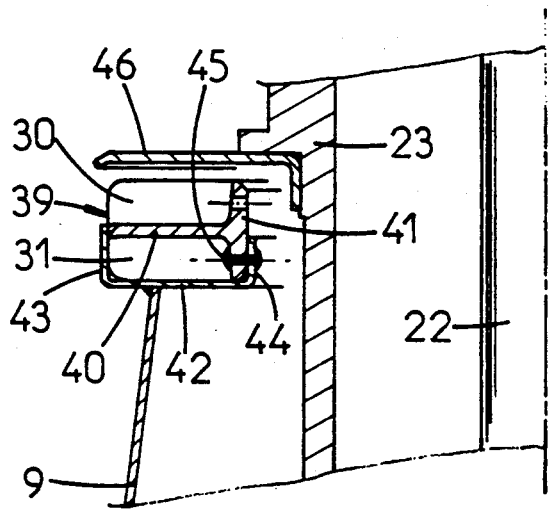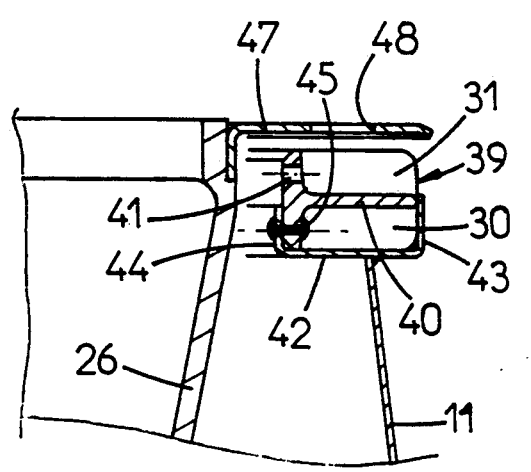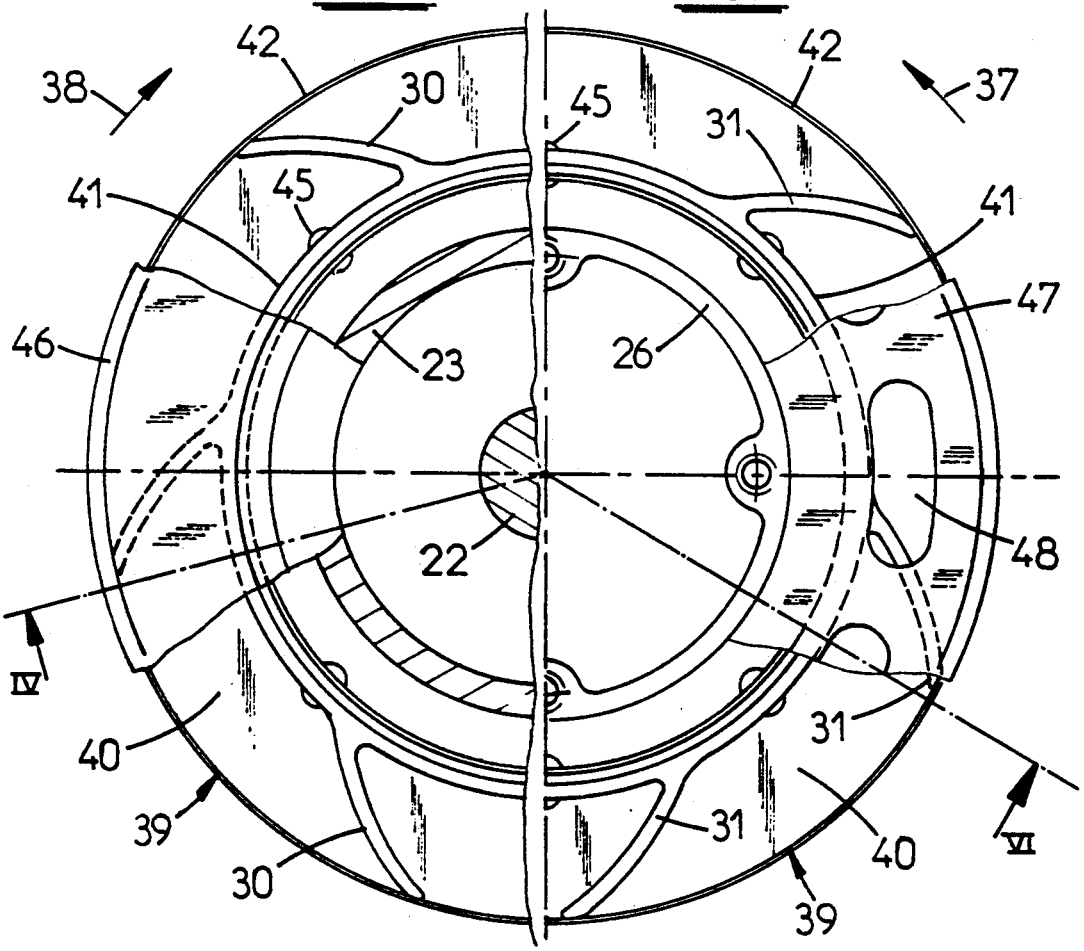

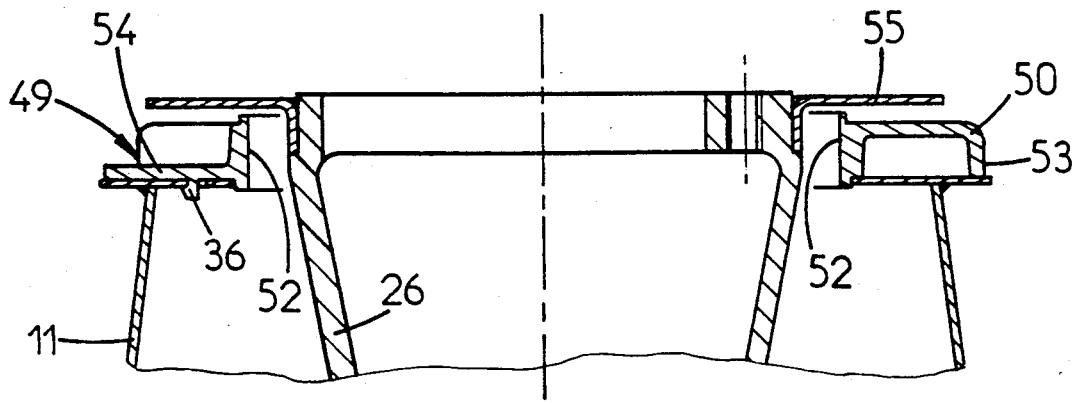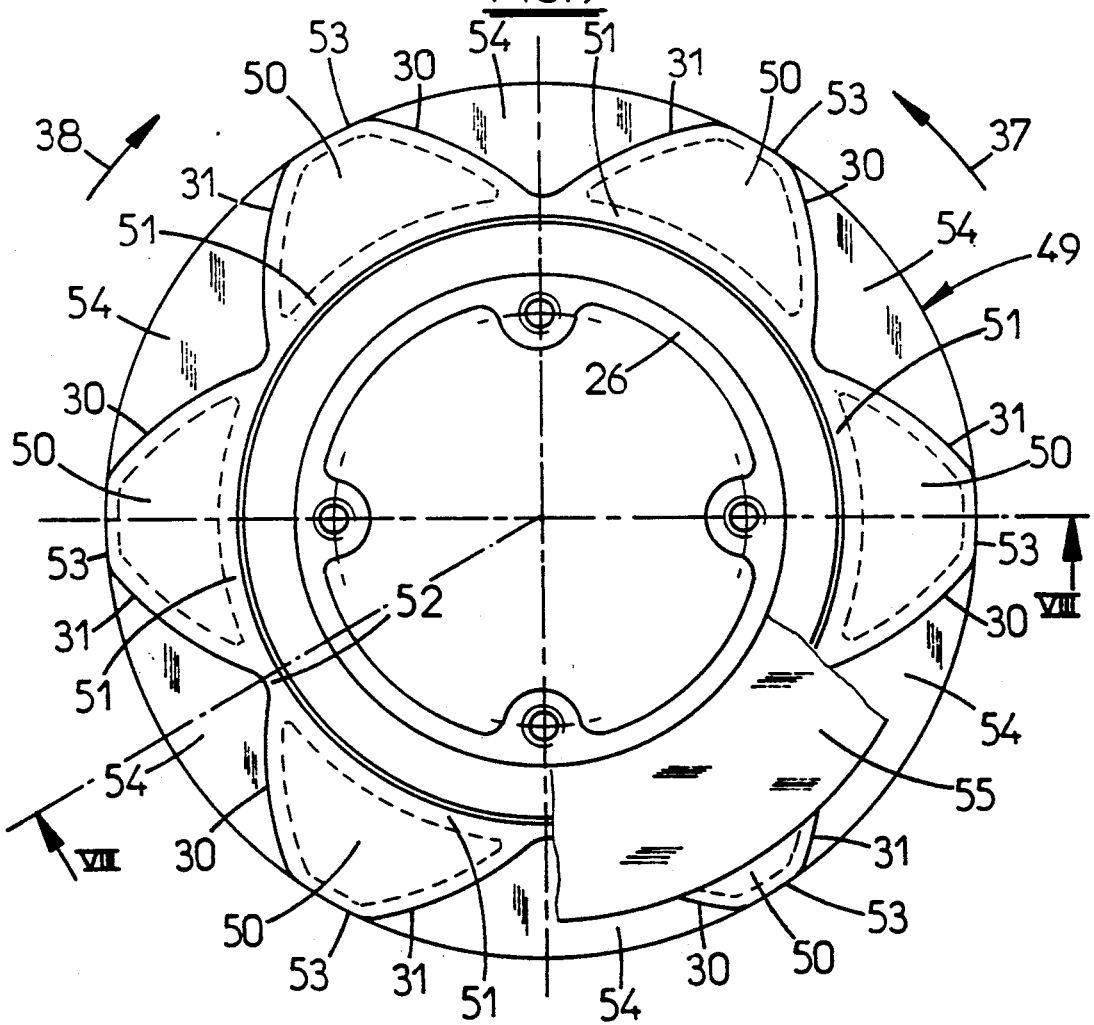

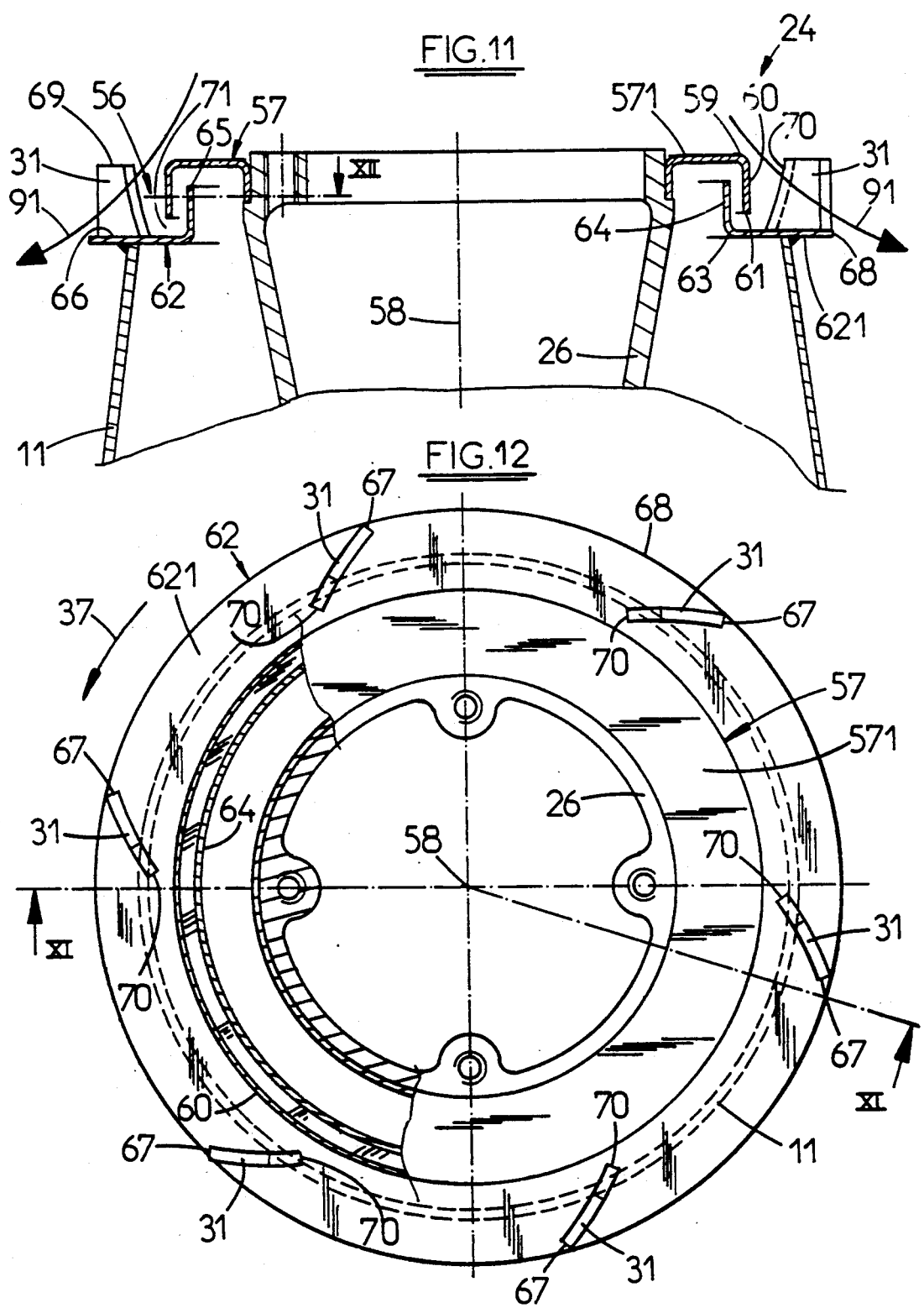

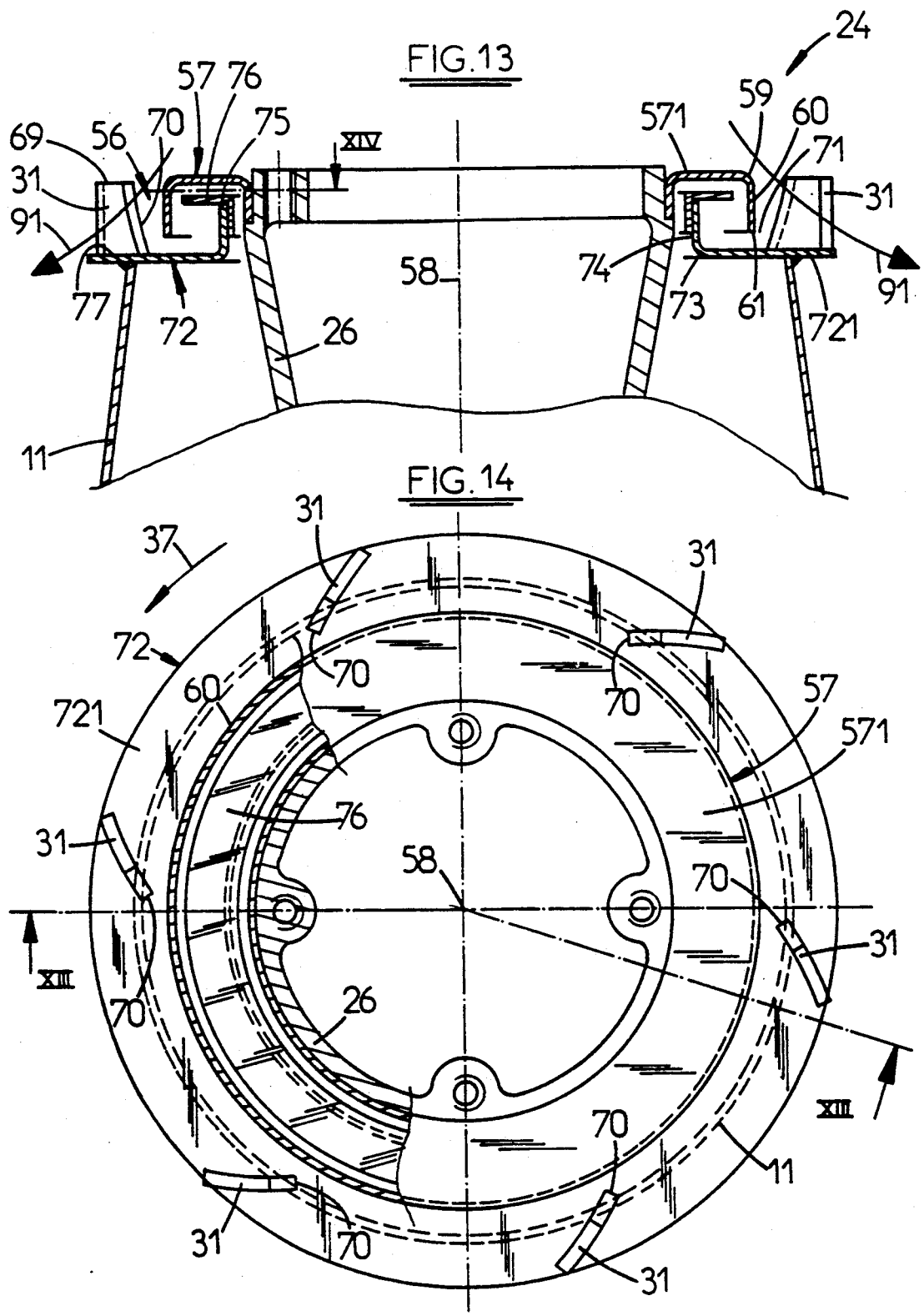

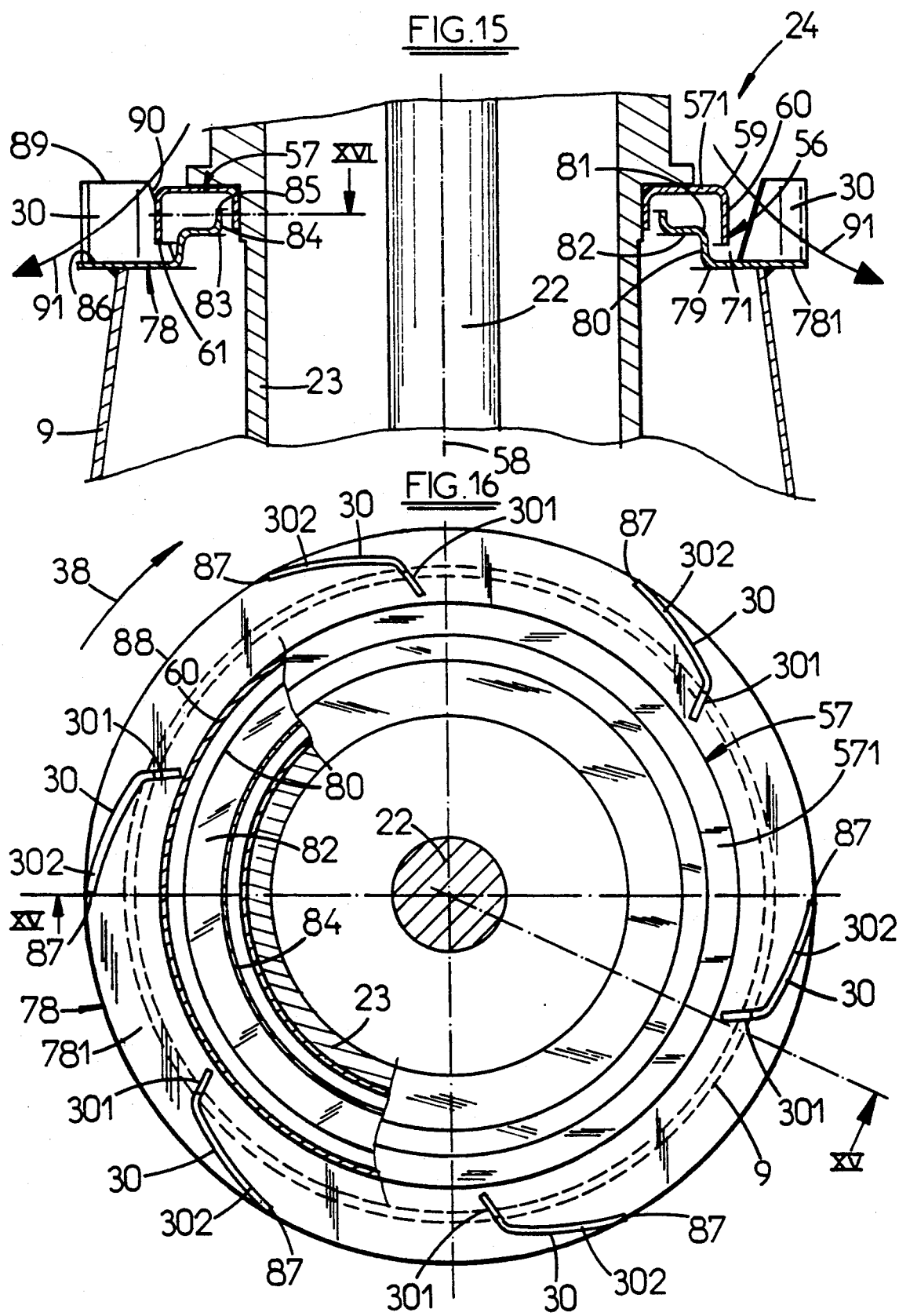

MOWER

This is a continuation of application Ser. No. 07/177,835, filed on Mar. 24, 1988 now U.S. Pat. No. 4,909,023.

FIELD OF THE INVENTION

This invention relates to a mower having a frame that supports, by means of connecting elements, a cutting element equipped with cutting tools. A rotary drum extends in part at least above the cutting element. A device for driving the cutting element and/or the rotary drum, and/or at least a part of the connecting elements penetrate inside the rotary drum by passing through its upper part.

BACKGROUND OF THE INVENTION

A mower of this general type is known which has a plurality of cutting elements guided in rotation on the upper face of a housing. The cutting element located at each end of the housing is surmounted by a rotary drum of a certain volume. The device for drivng the cutting elements and the rotary drums, and a part of the connecting elements which connect the cutting elements to the frame, penetrate inside the first drum by passing through its upper part. The other part of the connecting elements which connect the cutting elements to the frame penetrates inside the second drum by passing through its upper part. The latter connecting elements having a swivel bearing, so that the housing—connecting elements—frame assembly is not rigid. The housing can thus move to a certain extent in relation to the connecting elements and to the frame. This is important, given that the housing is in contact with the ground during work, and the ground can be very uneven.

Moreover, since the drums are made by forming and are fastened on the cutting elements by welding, it can happen that the upper part of the drums are offset in relation to the connecting elements.

Since the connecting elements are immobile and the drums inside of which at least a part of these connecting elements penetrate are rotary, it has been necessary to make, between the connecting elements and the upper part of the drums, a certain space to make possible, on the one hand, a certain movement of the housing and the drums in relation to the connecting elements and the frame, and, on the other hand, the rotation of the drums even if their upper part is offset in relation to the connecting elements.

When the known mower works, the two drums surmounting the outside cutting elements avoid the hooking of cut crop on the driving device and/or on the connecting elements. Additionally, the two drums windrow the cut crop to reduce the width of the windrow left by the mower. The crop which is moved by the drums rises along the drums, and a part of it penetrates inside the drums through the space made between the connecting elements and the upper part of the drums. Moreover, inside the drums are found crop seeds and earth.

Under the effect of the very high speed of the drums, the plant debris and the earth accumulate to form a very compact and relatively heavy mass. That heavy mass causes very great unbalancings of the mower. The unbalancings substantially increase the load on the bearings which guide, in rotation, the cutting elements that surmount the drums, as well as the load on the swivel bearing that has the connecting elements penetrating into the second drum. This reduces the service life of the bearings and the swivel bearing.

In addition, the accumulation of plant debris and earth forms a very abrasive mass which quickly wears out the connecting elements.

These phenomena are greater the larger the volume of the drums.

OBJECT OF THE INVENTION

The object of this invention is to remedy, or at least to substantially ameliorate, the drawbacks described above.

SUMMARY OF THE INVENTION

For this purpose, the mower according to the invention is characterized by the fact that rotary push-back blades are mounted on the upper part of each of the rotary drums.

Advantageously, the rotary push-back blades are directed outwardly in the direction opposite their direction of rotation. With these characteristics, the introduction of plant debris and earth inside the rotary drums is sharply reduced—indeed, substantially eliminated.

During the rotation, the rotary push-back blades produce both a mechanical action and a pneumatic action on the plant debris and the earth which arrive in the vicinity of the upper part of the rotary drums. The mechanical action acts mainly on the cut crop stems and on the earth, whereas the pneumatic action acts more on the small particles of crop and on the very fine earth. In this way, the plant debris and the earth are pushed back as soon as they arrive in the vicinity of the rotary push-back blades, and therefore they can no longer significantly penetrate inside the drum. This push-back action is particularly important when the outside diameter swept by the rotary push-back blades is greater than the outside diameter of the upper part of the drum casing on which the rotary push-back blades are mounted.

Advantageously, the average diameter swept by the rotary push-back blades is approximately equal to the outside diameter of the upper part of the drum casing.

According to an additional characteristic, the rotary push-back blades are fastened to the upper face of a collar-shaped flange. The rotary push-back blades are thus relatively rigid and can cause a vigorous action on the plant debris and earth which otherwise might penetrate into the rotary drums.

According to an embodiment of the invention, a tubular element extends at the level of the inside diameter swept by the rotary push-back blades. Preferably, all the rotary push-back blades are connected to one another at the level of the inside diameter that they sweep by means of this tubular element. Advantageously, this tubular element is connected to the collar-shaped flange at the level of the inside diameter of the collar-shaped flange. Advantageously also, the tubular element extends at least approximately up to the upper part of the rotary push-back blades. The tubular element thus stiffens the rotary push-back blades even more. In addition, it closes the inside part of the space extending between two adjacent rotary push-back blades. In this way, if any debris happens to penetrate into the space between two adjacent rotary push-back blades, it is stopped by the tubular element and is then ejected under the effect of centrifugal force.

According to an additional characteristic of the invention, the rotary push-back blades are fastened to the rotary drum on which they are mounted. The rotary push-back blades thus rotate at a good speed and can act well against the various debris. In addition, the rotary push-back blades are fastened in relation to the rotary drum. This makes it possible to connect the rotary push-back blades correctly to the rotary drums so that there is no opening between the rotary push-back blades and the rotary drum through which debris that escape the action of the rotary push-back blades could be introduced.

The mower according to the invention can have a plurality of rotary cutting elements a first group of which rotates in one direction and a second group of which rotates in the opposite direction. In this case, the rotary push-back blades that are mounted on the upper part of a rotary drum surmounting a rotary cutting element of the first group are directed in the direction opposite those which are mounted on the upper part of a rotary drum surmounting a rotary cutting element of the second group.

The rotary cutting elements can, in a preferred embodiment, be guided in rotation at the upper part of a housing which is connected to the frame by means of connecting elements. At least a part of the rotary cutting elements are surmounted by rotary drums at least one of which is penetrated by the device for driving the rotary cutting elements and/or by at least a part of the connecting elements.

According to another possible embodiment, the cutting element is mounted along a cutting bar. A rotary drum extends at each end of the cutting bar, and the cutting bar is connected to the frame by connecting elements that go through the rotary drums. The drive device of the cutting elements extends through at least one of the counterrotating drums. In this case too, the rotary push-back blades that are mounted on the upper part of one of the rotary drums are directed in the direction opposite those mounted on the upper part of the other rotary drum.

According to another embodiment, the rotary push-back blades are substantially or entirely uncovered, and a baffle is housed between the part of the connecting elements penetrating inside the rotary drum and the rotary drum. The baffle extends to the level of the inside diameter swept by the rotary push-back blades. Thanks to this arrangement, the rotary push-back blades generate less turbulent air flows, while continuing to exert their mechanical action and the baffle stops the entry of very fine earth or fine sand inside the rotary drum.

BRIEF DESCRIPTION OF THE DRAWINGS

FIG. 4 is a longitudinal section along the line IV in FIG. 5 of the upper part of the left drum of the mower of FIG. 1 equipped with another embodiment of the rotary drum of FIG. 1.

FIG. 5 is a top view, partially in section, of the arrangement of FIG. 4.

FIG. 6 is a longitudinal section along the line VI of FIG. 7 of the upper part of another embodiment of the right drum of the mower of FIG. 1.

FIG. 7 is a top view, partially in section, of the arrangement of FIG. 6.

FIG. 8 is a longitudinal section along the line VIII—VIII in FIG. 9 of the upper part of another embodiment of the right drum of the mower of FIG. 1.

FIG. 9 is a top view, partially in section, of the arrangement of FIG. 8.

FIG. 11 is a longitudinal section along the line XI—XI in FIG. 12 of the upper part of the right drum of the mower of FIG. 10 equipped with a first embodiment of the invention.

FIG. 12 is a top view, partially in section, along the line XII in FIG. 11 of the arrangement of FIG. 1.

FIG. 13 is a longitudinal section along the line XIII—XIII in FIG. 14 of the upper part of the right drum of the mower of FIG. 10, equipped with another embodiment of the invention.

FIG. 14 is a top view, partially in section, along the line XIV in FIG. 13 of the arrangement of FIG. 13.

FIG. 15 is a longitudinal section along the line XV—XV in FIG. 16 of the left drum of the mower of FIG. 10, equipped with another ,embodiment of the invention.

FIG. 16 is a top view, partially in section, along the line XVI in FIG. 15 of the arrangement of FIG. 15.

DETAILED DESCRIPTION OF THE PRESENTLY PREFERRED EMBODIMENTS

Figure 1:
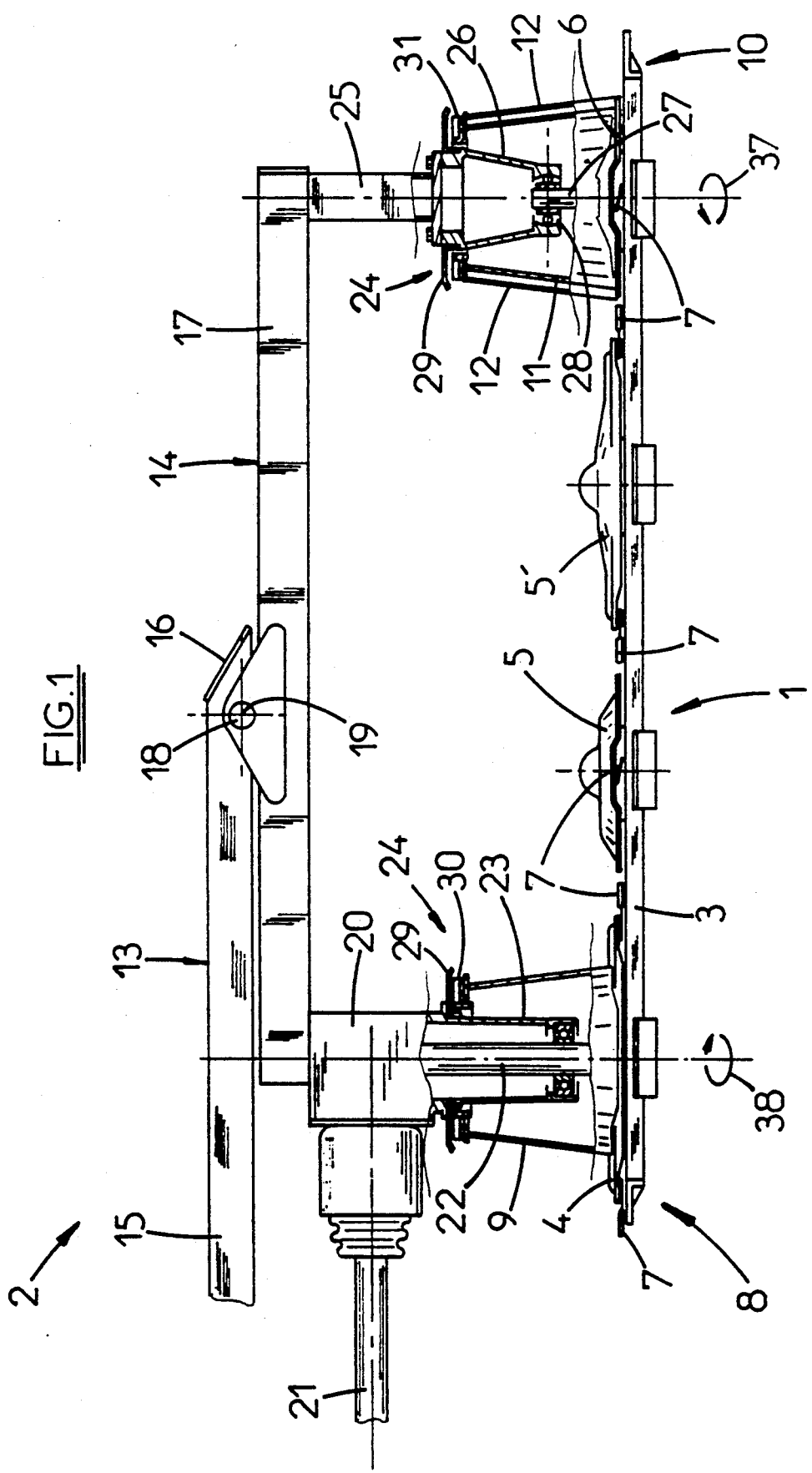
FIG. 1 is a partial rear view of a mower according to the invention.
Figure 10:
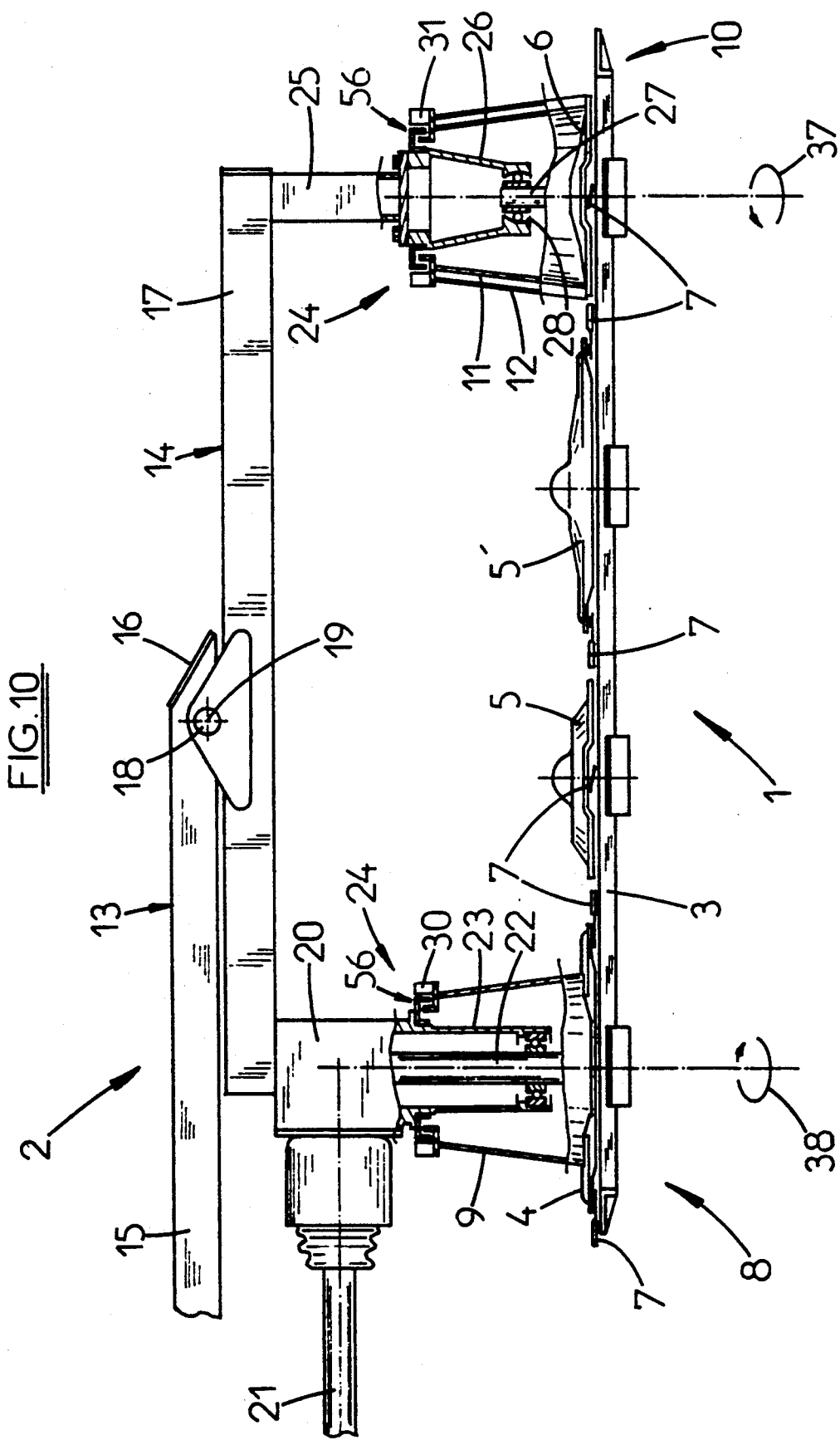
FIG. 10 is a partial rear view of a second mower according to the invention.

FIGS. 1 and 10 show a cutting bar 1 of a mower 2 according to the invention. The cutting bar 1 is equipped with a housing 3 at the upper part of which rotary cutting elements 4, 5, 5', and 6 are guided in rotation. The rotary cutting elements 4, 5, 5', and 6 are equipped with cutting tools 7.

The rotary cutting element 4 located at the left end 8 of the cutting bar 1 is surmounted by a rotary drum 9, while the rotary cutting element 6 located at the right end 10 of the cutting bar 1 is surmounted by a rotary drum 11. The rotary drums 9 and 11 have a relatively great height (at least equal to the largest diameter of their outer casing), which gives them a large volume. The rotary drums 9 and 11 are, in this example, welded on the corresponding rotary cutting elements 4 and 6 and therefore rotate with the corresponding rotary cutting elements 4 and 6. The rotary cutting elements 4 and 6 rotate in opposite directions and in directions such that the crop cut by the rotary cutting elements 4 and 6 is brought back to the middle of the cutting bar 1.

Since the rotary cutting elements 4 and 6 rotate in opposite directions, the rotary drums 9 and 11 which surmount them also rotate in opposite directions. The rotary drums 9 and 11 fulfill a function of windrowing the crop cut by the rotary cutting elements 4 and 6 so that the windrow left behind the cutting bar 1 has a width less than the cutting width of the cutting bar 1. For this purpose, the rotary drums 9 and 11 are equipped with drivers 12.

The cutting bar 1 is connected to a frame 13 of the mower 2 by connecting elements 14. In FIGS. 1 and 10, only a part of the frame 13 has been represented, in this case a support bar 15. The support bar 15 is connected by its right end 16 to a support beam 17 (which is one of the connecting elements 14) by means of an articulation 18 the axis 19 of which is directed at least approximately in the direction of advance of the mower 2 during work.

At the other end, the support bar 15 is connected by a structure, not shown but well known in the art, to the hitch of a tractor vehicle (also not shown) to which the mower 2 is attached.

At its left end, the support beam 17 is attached to a transmission housing 20 which contains elements for driving the rotary cutting elements 4, 5, 5', and 6 and the rotary drums 9 and 11. Those elements are also well known in the art. They are actuated by a drive shaft 21 with universal joints which transmit the movement from the power take-off of the tractor vehicle to the drive elements The only drive element that can be seen in FIGS. 1 and 10 is a shaft 22. The shaft 22 passes through the rotary drum 9 and drives the rotary cutting elements 4 and the rotary drum 9 in rotation. The shaft 22 also drives other drive elements housed inside the housing 3. These other drive elements drive the other rotary cutting elements 5, 5', and 6 in rotation, as well as the rotary drum 11 surmounting the rotary cutting element 6.

In FIGS. 1 and 10, it is seen that the transmission housing 20 has a tubular bearing 23 which extends downwardly and passes through the upper part 24 of the rotary drum 9. As previously described, the shaft 22 is a drive element, but it is also a connecting element, since the left end 8 of the cutting bar 1 is connected to the support beam 17 by the shaft 22 and the transmission housing 20.

At its right end, the support beam 17 has a leg 25 that extends downwardly. The leg 25 is fastened at its lower end to the upper end of the tubular bearing 26. The fastening zone extends above the rotary drum 11. The tubular bearing 26 passes through the upper part 24 of the rotary drum 11. The rotary cutting element 6 has a shaft 27 which extends upwardly and which is connected to the tubular bearing 26 by means of a swivel bearing 28 which allows the cutting bar 1 a certain movement. The right end 10 of the cutting bar 1 is therefore connected to the support beam 17 by the swivel bearing 28, the tubular bearing 26, and the leg 25, which are elements for connecting the cutting bar 1 to the frame 13.

In FIG. 1, it is seen that the upper part 24 of the rotary drum 9 is closed by a plugging flange 29 which is connected to the transmission housing 20, while the upper part 24 of the rotary drum 11 is closed by a plugging flange 29 which is fastened to the tubular bearing 26. The outward edge of the plugging flange 29 is folded somewhat downwardly. Between each plugging flange 29 and the upper part 24 of the corresponding rotary drum 9 or 11, there is a space to allow for manufacturing tolerances and the movement of the cutting bar 1. In this space, according to the invention, there have been housed rotary push-back blades 30 and 31 which push back the plant or other debris and appreciably prevent such debris from penetrating inside the rotary drums 9 and 11.

Figure 2:
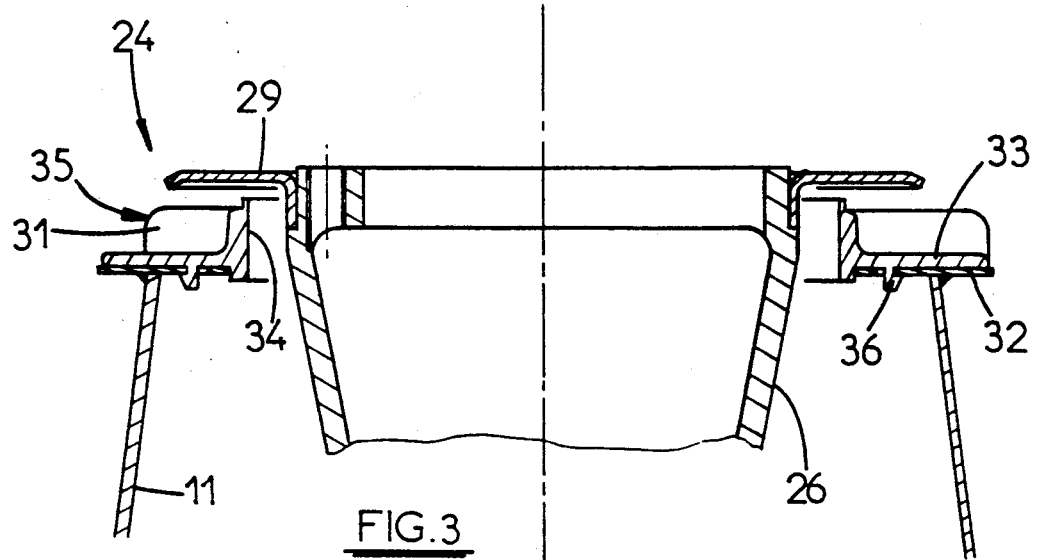
FIG. 2 is a longitudinal section along the lines II—II of FIG. 3 of the upper part of the right drum of the mower of FIG. 1 on a larger scale.

In FIG. 2, which shows the rotary drum 11, it is seen that the plugging flange 29 is fitted on the upper part of the tubular bearing 26. The plugging flange 29 has an outside diameter smaller than the outside diameter swept by the rotary push-back blades 31.

The outside casing of the rotary drum 11 in its upper part 24 is attached to a planar and horizontal collar 32. The collar 32 has an outside diameter larger than the upper outside diameter of the casing of the rotary drum 11. The collar 32 serves as a base for fastening the rotary push-back blades 31. The rotary push-back blades 31 extend opposite the plugging flange 29 and are fastened at their bases to a flange 33 in the shape of a collar. At the level of the inside diameter swept by the rotary push-back blades 31, they are also all connected to one another by a tubular element 34. The tubular element 34 extends at least approximately up to the upper part of the rotary push-back blades 31, so that at the level of the inside diameter, the space between two adjacent rotary push-back blades 31 is closed.

In addition, the flange 33 and the tubular element 34 are integral with one another at the level of the inside diameter of the flange 33. The rotary push-back blades 31 are thus relatively rigid and can cause a vigorous action on the plant debris and earth entering the space between the plugging flange 29 and the upper part 24 of the rotary drum 11. Moreover, since the tubular element 34 closes the inside part of the space extending between two adjacent rotary push-back blades 31, any debris which happens to penetrate into the space between two adjacent rotary push-back blades 31 is stopped by the tubular element 34 and therefore cannot penetrate inside the rotary drum 11. After having been stopped by the tubular element 34, it is then ejected by centrifugal force. The unit comprising the rotary push-back blades 31, the flange 33, and the tubular element 34 forms a push-back element 35. The push-back element 35 is preferably made integrally of cast or injected material. This makes it possible to give the rotary push-back blades 31 an optimal shape and to reproduce that shape relatively reliably from one piece to the next.

The flange 33, moreover, has clips 36 which penetrate into appropriate openings made in the collar 32 of the rotary drum 11.

In the right side of FIG. 2, it is seen that the outside diameter swept by the rotary push-back blades 31 is greater than the diameter of the upper part of the outside casing of the rotary drum 11. The diameter of the upper part of the outside casing of the rotary drum 11 is at least approximately equal to the average diameter swept by the rotary push-back blades 31.

Figure 3:
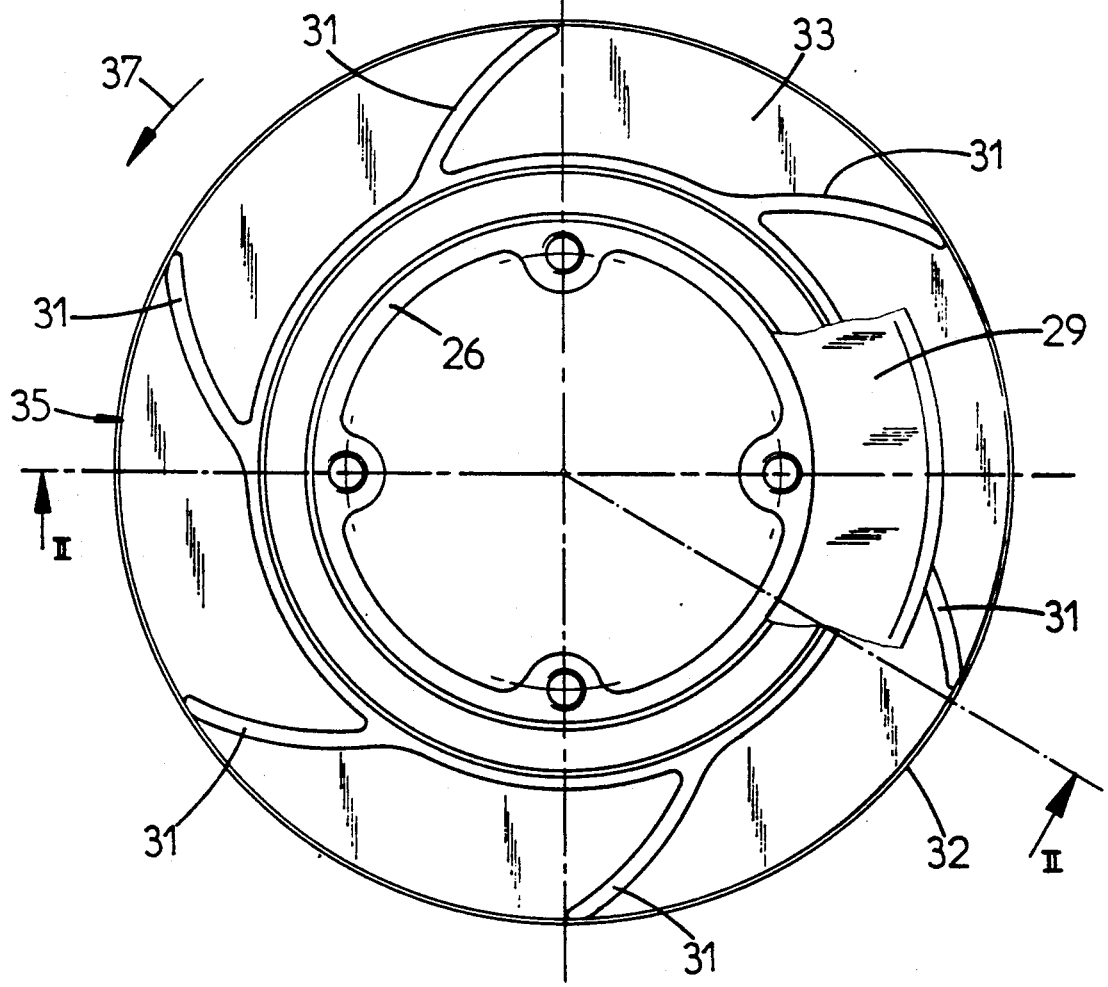
FIG. 3 is a top view, partially in section, of the arrangement of FIG. 2.

In FIG. 3, the shape of the rotary push-back blades 31 is seen. They are directed outwardly in the direction opposite their direction of rotation, which is indicated by an arrow 37.

While in FIGS. 2 and 3, the rotary push-back blades 31 of the right rotary drum 11 are illustrated, it will be understood that, for the left rotary drum 9, the rotary push-back blades 30 will be directed in the direction opposite the rotary push-back blades 31, since the left rotary drum 9 rotates in a direction of rotation indicated by an arrow 38 (see FIG. 1) opposite the direction of rotation of the right rotary drum 11. In this way, the rotary push-back blades 30 will also be directed outwardly in the direction opposite the direction of rotation of the left rotary drum 9. The rotary push-back blades 30 are part of a push-back element 35'.

This then necessitates two different push-back elements 35 and 35', one equipped with the rotary push-back blades 30 for the left rotary drum 9 and the other equipped with the rotary push-back blades 31 for the right rotary drum 11.

In FIGS. 4–7, another example of a push-back element 39 has been shown that can be mounted either on the rotary drum 9 or on the rotary drum 11.

The push-back element 39 has a collar-shaped flange 40 which is connected at the level of its inside diameter to a tubular element 41. On one side of the flange 40 are fastened the rotary push-back blades 30, and on the other side of the flange 40 are fastened the rotary push-back blades 31. On each side of the flange 40 the tubular element 41 extends at least approximately up to the upper edge of the rotary push-back blades 30 or 31, so as to close toward the back the space between two adjacent push-back blades 30 or 31.

At the upper part of the outside casing of the rotary drums 9 and 11 is fixed an upwardly open annular channel member 42. The channel member 42 serves as the housing for the push-back element 39. The radially outer lip 43 of the channel member 42 extends at least approximately up to the level of the flange 40. Accordingly, the rotary push-back blades that are not supposed to work are entirely buried in the channel member 42, which has a width at least approximately equal to that of the push-back element 39. In this way, the harmful action that the buried push-back blades could produce is prevented.

Each push-back element 39 is fastened t the radially inner lip 44 of the corresponding channel member 42 by means of fastening elements 45.

Furthermore, in this example, it is seen that the outside diameter of plugging flanges 46 and 47 located opposite the rotary push-back blades 30 and 31 is at least approximately equal to the outside diameter swept by the rotary push-back blades 30 and 31. As in the preceeding example, the outside edge of the plugging flanges 46 and 47 is also somewhat downwardly folded.

In the example of FIGS. 6 and 7, air intake holes 48 have been made in the plugging flange 47 located opposite the rotary push-back blades 31 so as to create a good air flow directed outwardly.

In the embodiment of FIGS. 4–7, it is therefore enough to produce a single type of push-back element. In the case of the rotary drum 9, the rotary push-back blades 30 are pointed upwardly, and, in the case of the rotary drum 11, the rotary push-back blades 31 are pointed upwardly. Moreover, when the rotary push-back blades 30 of the push-back element 39 of the rotary drum 9 are worn out, it is possible to mount the push-back element 39 of the rotary drum 11 on the rotary drum 9 by pointing the rotary push-back blades 3 upwardly, since those blades have not previously worked and are therefore not worn. Reciprocally, the push-back element 39 of the rotary drum 9 will then be mounted on the rotary drum 11 by pointing the rotary push-back blades 31 upwardly.

In FIGS. 8 and 9, another example of a push-back element 49 has been illustrated. This embodiment has a certain number of bulges 50 which, in top view, have approximately a curvilinear triangular shape. The base 51 of each bulge 50 is fastened to a tubular element 52, and the point 53 of each bulge 50 is directed outwardly. The bulges 50 are at least approximately symmetrical, and their bases 51 are contiguous. Their front sides, considering the direction of rotation indicated by the arrow 38, constitute the rotary push-back blades 30, and their front sides, considering the direction of rotation indicated by the arrow 37, constitute the rotary push-back blades 31.

Between the bulges 50 are housed flange portions 54 which extend in an at least approximately parallel plane. The push-back elements 49 are fastened to the upper part of the rotary drums 9 and 11 by means of the clips 36. Moreover, a plugging flange 55 extends opposite the bulges 50.

A mower 2 equipped with one of the various push-back element 35, 35', 39, or 49 described with reference to FIGS. 1–9 functions in the following manner.

During work, the mower 2 is moved by a tractor the power take-off of which drives the rotary cutting elements 4, 5, 5', and 6 and the rotary drums 9 and 11 in rotation. While rotating, the rotary cutting elements 4, 5, 5', and 6 cut the crop that appears in front of them and remove it behind the cutting bar 1, where it is deposited in a windrow. The width of this windrow is determined by the rotary drums 9 and 11. In addition to their windrowing function, the rotary drums 9 and 11 further fulfill a function of protecting the drive device and the elements for connecting the cutting bar 1 to the frame 13. In this way, the crop cut by the rotary cutting elements 4 and 6 cannot remain hooked to the drive device or to the connecting elements.

The crop moved by the rotary drums 9 and 11 has a tendency to rise along the rotary drums 9 and 11. Moreover, during mowing, various plant debris are suspended in the air, as well as particles of earth (when the mower encounters a mole hill, for example). This crop this debris, and these particles cannot appreciably penetrate inside the rotary drums 9 and 11 because of the rotary push-back blades 30 and 31 which, by rotating, push them back, by exerting both a mechanical action and a pneumatic action on them. The mower 2 according to the invention thus has a longer service life.

In FIG. 10, it is seen that, at the upper part 24 of the rotary drum 9, are mounted the rotary push-back blades 30 and that, at the upper part 24 of the rotary drum 11, are mounted the rotary push-back blades 31. Each group of rotary push-back blades 30 and 31 is combined with a baffle 56. The arrangement of the rotary push-back blades 30 and 31 and of the baffles 56 appears in more detail in FIGS. 11–16.

In FIG. 11, it is seen that the tubular bearing 26 is equipped with a flange 57 which constitutes the first flange of the baffle 56. The flange 57 comprises a collar 571, preferably annular, which extends at least approximately perpendicularly to the axis of rotation 58 of the rotary drum 11. The outside perimeter 59 of the collar 571 is equipped with a wall of revolution 60 centered on the axis of rotation 58 of the rotary drum 11. The wall of revolution 60 extends downwardly and, in the example shown, it is at least approximately cylindrical. At its free end 61 away from the collar 571, the wall of revolution 60 extends in the vicinity of a flange 62 which constitutes the second flange of the baffle 56.

The flange 62 has a collar 621, preferably annular, which also extends at least approximately perpendicularly to the axis of rotation 58 of the rotary drum 11. In addition, the second flange 62 is located lower than the first flange 57. The flange 62 is fastened to the top of the rotary drum 11. The inside perimeter 63 of the collar 621 is equipped with a wall of revolution 64 centered on the axis of rotation 58 of the rotary drum 11. The wall of revolution 64 extends upwardly and, in the example shown, is at least approximately cylindrical. At its free end 65 away from the collar 621, the wall of revolution 64 extends in the vicinity of the first flange 57. The wall of revolution 64 of the second flange 62 is located in the vicinity of the wall of revolution 60 of the first flange 57 and is located closer to the axis of rotation 58 of the rotary drum 11 than the wall of revolution 60 of the first flange 57. Moreover, the free end 65 of the wall of revolution 64 is located higher than the free end 61 of the wall of revolution 60. In this way, the first flange 57 and its corresponding wall of revolution 60 at least partially overlaps the wall of revolution 64 of the second flange 62.

The second flange 62, as said above, is fastened to the top of the rotary drum 11. The rotary push-back blades 31 are fastened to an upper face 66 of the collar 621. The outside edges 67 of the rotary push-back blades 31 extend at least approximately in the vicinity of the outside perimeter 68 of the collar 621 of the second flange 62, the diameter of which is greater than the diameter of the top of the casing of the rotary drum 11. In this way, the rotary push-back blades 31 substantially extend, in top view (see FIG. 12), to a diameter greater than the diameter of the upper part of the casing of the rotary drum 11.

Moreover, the rotary push-back blades 31 also extend in the direction opposite the direction of rotation (indicated by the arrow 37) of the rotary drum 11. The angle of inclination of the rotary push-back blades 31 is such that the plant debris do not hook there, but such that the pneumatic effect that the rotary push-back blades 31 produce has a sufficient strength to force back small plant debris, earth, or fine sand.

As can be seen in FIG. 11, the height of the rotary push-back blades 31 is such that their free ends 69 extend at least approximately to the same level as the collar 571 of the first flange 57. Moreover, the rotary push-back blades 31 are entirely uncovered.

It is also seen in FIGS. 11-12 that the inside edges 70 of the rotary push-back blades 31 that extend opposite the wall of revolution 60 of the first flange 57 are inclined outwardly and upwardly in such a way that, in their upper parts, the inside edges 70 are farther away from the wall of revolution 60 than in their lower parts. In this way, the plant debris which arrive in the zone located between the wall of revolution 60 of the first flange 57 and the inside edges 70 of the rotary push-back blades 31 can easily disengaged themselves.

The distance between the walls of revolution 60 and 64, as well as the distance between the free ends 61 and 65 of the walls of revolution 60 and 64 and the collars 621 and 571 of the flanges 62 and 57, are such that the rotary drum 11 can move in relation to the tubular bearing 26 without the various elements of the baffle 56 coming in contact.

Finally, it is further seen in FIG. 11 that the baffle 56 is arranged so that the intake 71 of the baffle 56 extends to the bottom of the rotary push-back blades 31.

In FIGS. 11 and 12, only the rotary drum 11 has been represented. However, it will be understood that the arrangement of the rotary drum 9 is similar, except with reference to the rotary push-back blades 30, which are directed in the direction opposite the rotary push-back blades 31, given that the rotary drum 9 rotates in the direction opposite the direction of rotation of the rotary drum 11.

In FIG. 13, it is seen that the tubular bearing 26 is equipped with the flange 57 which constitutes the first flange of the baffle 56. The flange 57 is at least approximately identical with the one which is illustrated in FIGS. 11 and 12.

At the free end 61 away from the collar 571 of the flange 57, the wall of revolution 60 extends in the vicinity of a flange 72 which constitutes, in this embodiment, the second flange of the baffle 56.

The flange 72 has a collar 721, preferably annular, which also extends at least approximately perpendicularly to the axis of rotation 58 of the rotary drum 11.

The flange 72 is also located lower than the first flange 57 and is fastened to the top of the rotary drum 11. The inside perimeter 73 of the collar 721 of the flange 72 is equipped with a wall of revolution 74 centered on the axis of rotation 58 of the rotary drum 11. The wall of revolution 74 extends upwardly, toward the first flange 57. In addition, it extends closer to the axis of rotation 58 of the rotary drum 11 than the wall of revolution 60 of the first flange 57. Moreover, it is at least approximately cylindrical.

The wall of revolution 74 extends up to the vicinity of the first flange 57. At its end 75 away from the collar 721, it is equipped with a second collar 76 which extends outwardly, toward the wall of revolution 60 of the first flange 57. The second collar 76, moreover, extends at least approximately perpendicularly to the axis of rotation 58 of the rotary drum 11.

The flanges 57 and 72 are thus made in such a way that the first flange 57 partially overlaps the second flange 72. That is, the first and second flanges 57 and 72 act as a labyrinth bearing.

The distance which separates the wall of revolution 74 and the second collar 76 from the first flange 57 is such that the rotary drum 11 can move a little in relation to the tubular bearing 26. This distance can be reduced if the second collar 76 is made of a flexible material. In that case, during the movement of the rotary drum 11 in relation to the tubular bearing 26 and to the first flange 57, the second collar 76 will deform when it comes into contact with the first flange 57. This is possible because, in practice, such contacts are brief and infrequent.

The rotary push-back blades 31 are fastened to the upper face 77 of the collar 721 of the second flange 72. The arrangement and structure of the rotary push-back blades 31 are at least approximately identical to the arrangement and structure of the rotary push-back blades 31 described with reference to FIGS. 11 and 12.

Finally, it is seen in FIG. 13 that the baffle 56 is also made in such a way that the intake 71 of the baffle 56 extends to the low part of the rotary push-back blades 31.

In FIGS. 13 and 14, only the rotary drum 11 has been shown. However, it will be understood that the arrangement of the rotary drum 9 is similar, except with reference to the rotary push-back blades 30. The rotary push-back blades 30 are directed in the direction opposite the rotary push-back blades 31, given that the rotary drum 9 rotates in the direction opposite the direction of rotation of the rotary drum 11.

In FIG. 15, it is seen that the tubular bearing 23 is equipped with a flange 57, which constitutes the first flange of the baffle 56. The flange 57 is at least approximately identical with the one which is shown in FIGS. 11, 12, 13, and 14.

At the free end 61 away from the collar 571 of the flange 57, the wall of revolution 60 extends in the vicinity of a flange 78 which constitutes, in this embodiment, the second flange of the baffle 56.

The flange 78 has a collar 781, preferably annular, which also extends at least approximately perpendicularly to the axis of rotation 58 of the rotary drum 9. The flange 78 is also located lower than the first flange 57. The flange 78 is fastened to the top of the rotary drum 9. The inside perimeter 79 of the collar 781 is equipped with a first wall of revolution 80 centered on the axis of rotation 58 of the rotary drum 9. The first wall of revolution 80 can be relatively small. It extends upwardly and is at least approximately cylindrical. At its end 81 away from the collar 781, the first wall of revolution 80 is connected to a second collar 82 which extends toward the axis of rotation 58 of the rotary drum 9.

Moreover, the second collar 82 extends at least approximately perpendicularly to the axis of rotation 58 of the rotary drum 9. The inside perimeter 83 of the second collar 82 is provided with a second wall of revolution 84 centered on the axis of rotation 58 of the rotary drum 9. The second wall of revolution 84 can also be relatively small. Moreover, the second wall of revolution 84 extends upwardly and is at least approximately cylindrical. At its free end 85, the second wall of revolution 84 extends in the vicinity of the first flange 57. In addition, the second wall of revolution 84 extends closer to the axis of rotation 58 of the rotary drum 9 than the first wall of revolution 80, which itself extends closer to the axis of rotation 58 of the rotary drum 9 than the wall of revolution 60 of the first flange 57.

The flanges 57 and 78 are thus made in such a way that the first flange 57 overlaps in part at least the second flange 78. The free end 61 of the wall of revolution 60 of the first flange 57 extends up to at least the vicinity of the first wall of revolution 80 of the second flange 78. The distance between the flanges 57 and 78 is such that the rotary drum 9 can move in relation to the tubular bearing 23 without the various elements of the baffle 56 coming in contact.

The rotary push-back blades 30 are fastened to the upper face 86 of the collar 781 of the second flange 78. The outside edges 87 of the rotary push-back blades 30 extend at least approximately in the vicinity of the outside perimeter 88 of the second flange 78, the diameter of which is greater than the diameter of the top of the casing of the rotary drum 9. In this way, the rotary push-back blades 30 substantially extend, in top view (see FIG. 16), to a diameter greater than the diameter of the upper part of the casing of the rotary drum 9. Morever, the rotary push-back blades 30 also extend in the direction opposite the direction of rotation of the rotary drum 9.

In this example, each rotary push-back blade 30 is subdivided into a rotary push-back blade 301 and a rotary push-back blade 302. The rotary push-back blades 301 extend more radially than the rotary push-back blades 302, and the rotary push-back blades 301 are arranged in front of the rotary push-back blades 302, considering the direction of rotation of the rotary drum 9. The rotary drum 9 thus has two groups of rotary push-back blades, the rotary push-back blades 301 and the rotary push-back blades 302. The rotary push-back blades 301 of the first group are sized, shaped, and positioned to create a significant pneumatic action, while the rotary push-back blades 302 of the second group instead create a mechanical action on the stems of cut crop. It will be understood that, within the context of the invention, the two groups of rotary push-back blades 301 and 302 can also be separated.

As can be seen in FIG. 15, the height of the rotary push-back blades 30 is such that their free ends 89 extend higher than the collar 571 of the first flange 57. The rotary push-back blades 30 are also entirely uncovered.

The inside edges 90 of the rotary push-back blades 30, like the inside edges 70 of the rotary push-back blades 31 shown in FIGS. 11, 12, 13, and 14, are inclined outwardly and upwardly.

Finally, it is further seen in FIG. 15 that the baffle 56 is also arranged in such a way that the intake 71 of the baffle 56 extends to the low part of the rotary push-back blades 30.

While only the rotary drum 9 has been shown in FIGS. 15 and 16, it will be understood that the example which is described there can also equip the rotary drum 11, except with reference to the rotary push-back blades 31 which will be directed in the opposite direction.

In the three examples which have just been described, the rotary push-back blades 30 and 31 are made of a material having a great bending strength. This is very advantageous because, since they are substantially or entirely uncovered, the rotary push-back blades 30 and 31 are very loaded during work, particularly when they come in contact with a hard object such as a stone.

A mower 2 equipped with the devices which have just been described with reference to FIGS. 10-16 operates in the following manner.

During work, it is also moved by a tractor the power take-off of which drives the rotary cutting elements 4, 5, 5', and 6 and the rotary drums 9 and 11 in rotation. While rotating, the rotary cutting elements, 4, 5, 5', and 6 cut the crop that appears in front of them and remove it behind the cutting bar 1, where it is deposited in a windrow. The width of the windrow is determined by the rotary drums 9 and 11. In addition to their windrowing function, the rotary drums 9 and 11 further fulfill a function of protecting the drive device and the elements for connecting the cutting bar 1 to the frame 13. In this way, the crop cut by the rotary cutting elements 4 and 6 cannot remain hooked to the drive device or to the connecting elements.

The crop moved by the rotary drums 9 and 11 has a tendency to rise along the rotary drums 9 and 11. Morever, during mowing, various plant debris are suspended in the air, as well as large particles of earth (when the mower encounters a mole hill, for example). When the crop, the plant debris, and the large particles of earth arrive in the action zone of the rotary push-back blades 30 and 31, which are substantially or entirely uncovered, the rotary push-back blades 30 and 31, by rotating, push them back, by exerting an essentially mechanical action on them. The devices according to this invention are thus effective under normal conditions.

However, the devices according to this invention are also effective under conditions where the ground is very dry and has an upper layer made of very fine earth or very fine sand. These particles of earth or fine sand are lifted during work and are suspended in the air in a relatively large concentration. The air charged with these particles of fine earth or fine sand must substantially not be able to penetrate inside the rotary drums 9 and 11, because it would discharge said particles inside the said rotary drums 9 and 11. Said particles would then remain in the inside of the rotary drums 9 and 11 which would then be filled relatively quickly.

The arrangement according to FIGS. 10-16 makes it possible to prevent the air from appreciably penetrating inside the rotary drums 9 and 11. Since the rotary push-back blades 30 and 31 are substantially or entirely uncovered, and considering the arrangement of the baffle 56, the air forced outwardly by the rotary push-back blades 30 and 31 comes from above the first flange 57. A current of air is thus created which flows at least approximately along an arrow 91. In this way, the air forced back by the rotary push-back blades 30 and 31 is mainly pumped outside the rotary drums 9 and 11 and not inside the rotary drums, so that no draught of air charged with particles of fine earth or fine sand is created inside the rotary drums 9 and 11.

If, however, it happens that particles of fine earth or fine sand pass between the rotary push-back blades 30 and 31, they are stopped by the wall of revolution 60 of the first flange 57 of the baffle 56. In this case, after having struck the wall of revolution 60, they will be directly thrown outwardly by the air current and by the mechanical action generated by the rotary push-back blades 30 and 31. If the particles pass between the rotary push-back blades 30 and 31 at the level of the intake 71 of the baffle 56, the following phenomenon will occur.

In the case of the embodiment of FIGS. 11 and 12, the particles will be stopped by the wall of revolution 64 of the second flange 62 of the baffle 56. As soon as they are stopped, they fall on the collar 621 of the second flange 62 and are therefore subjected to centrifugal force, since the flange 62 rotates. The centrifugal force forces them back outwardly into the action zone of the rotary push-back blades 30 and 31, where they will then also be thrown out by the air current and the mechanical action generated by the rotary push-back blades 30 and 31.

In the case of the embodiment of FIGS. 13 and 14, the particles of fine earth or fine sand will be stopped by the wall of revolution 74 of the second flange 72 of the baffle 56. As soon as they are stopped, they fall on the collar 721 of the second flange 72 and are therefore subjected to centrifugal force, which forces them back outwardly into the action zone of the rotary push-back blades 30 and 31, where they will be thrown outwardly.

If particles have reached up to the level of the second collar 76, they will also be stopped, will fall on the collar 721, and will be removed as explained above.

In the case of the embodiment of FIGS. 15 and 16, the particles of fine earth or fine sand will be stopped by the first wall of revolution 80 of the second flange 78 of the baffle 56. As soon as they are stopped, they fall on the collar 781 of the second flange 78 and are therefore subjected to centrifugal force which forces them back outwardly into the action zone of the rotary push-back blades 30 and 31, where they will be thrown outwardly, as explained above.

If particles of fine earth or fine sand have reached up to the level of the second collar 82 and of the second wall of revolution 84 of the second flange 78 of the baffle 56, they will also be forced back by the action of the centrifugal force generated by the second flange 78, which rotates. By so doing, they are sprayed against the inside of the wall of revolution 60 of the first flange 57 and then fall on the collar 781 of the second flange 78, which removes them as explained above.

Thanks to these arrangements, the service life of the mower according to this invention is increased, even under very dry conditions.

Various modifications, improvements, or combinations are possible without thereby going outside the scope of this invention.

What is claimed as new and desired to be secured by Letters Patent of the United States is:

1. A mower comprising:
   (a) a frame;
   (b) connecting elements;
   (c) a cutting means comprising cutting tools and a plurality of rotary drums extending in part at least above said cutting tools, each one of said plurality of rotary drums comprising an upper part, and at least one of said plurality of rotary drums comprising an opening extending from an upper edge of said upper part;
   (d) said cutting means being supported by said frame by means of said connecting elements;
   (e) a driving device for driving said cutting tools and said plurality of rotary drums;
   (f) at least a part of said connecting elements penetrating inside said at least one of said plurality of rotary drums by passing through said opening of said at least one of said plurality of rotary drums; and
   (g) a plurality of push-back blades extending at said upper part of said at least one of said plurality of rotary drums, above said opening of said at least one of said plurality of rotary drums, whereby said push-back blades prevent earth and/or plant-debris from penetrating inside said at least one of said plurality of rotary drums by passing through said opening arranged in said upper part of said at least one of said plurality of rotary drums.

2. A mower according to claim 1 wherein said plurality of rotary push-back blades are directed outwardly in the direction opposite the direction of rotation of said at least one of said plurality of rotary drums.

3. A mower according to claim 1 wherein opposite said plurality of rotary push-back blades a plugging flange is mounted.

4. A mower according to claim 3 wherein an outside diameter of said plugging flange is smaller than an outside diameter swept by said plurality of rotary push-back blades.

5. A mower according to claim 3 wherein an outside diameter of said plugging flange is at least approximately equal to an outside diameter swept by said plurality of rotary push-back blades.

6. A mower according to claim 4 wherein said plugging flange has air intake holes therethrough.

7. A mower according to claim 4 wherein an outside edge of said plugging flange is folded downwardly.

8. A mower according to claim 1 wherein an outside diameter swept by said plurality of rotary push-back blades is greater than an outside diameter of the upper part of said at least one of said plurality of rotary drums.

9. A mower according to claim 8 wherein an average diameter swept by said plurality of rotary push-back blades is at least approximately equal to an outside diameter of the upper part of said at least one of said plurality of rotary drums.

10. A mower according to claim 1 wherein:
    (a) each of said plurality of rotary push-back blades has an inner edge and
    (b) a tubular element extends to the vicinity of said inner edges.

11. A mower according to claim 10 wherein said inner edges of said plurality of rotary push-back blades are connected to one another by means of said tubular element.

12. A mower according to claim 10 wherein:
    (a) each of said plurality of rotary push-back blades has an upper part and
    (b) said tubular element extends at least approximately up to said upper part of each of said plurality of rotary push-back blades.

13. A mower according to claim 10 wherein:
    (a) said plurality of rotary push-back blades are fastened to a face of a collar-shaped flange and
    (b) said collar-shaped flange is connected to said tubular element at the level of the inside diameter of said collar-shaped flange.

14. A mower according to claim 1 wherein said plurality of rotary push-back blades are fastened to said at least one of said plurality of rotary drums.

15. A mower according to claim 14 wherein said plurality of rotary push-back blades are fastened to said at least one of said plurality of rotary drums by a plurality of clips.

16. A mower according to claim 1 wherein:
   (a) said cutting means includes:
       (i) a plurality of rotary cutting elements equipped with said cutting tools and
       (ii) a housing which is connected to said frame by means of said connecting elements, said housing having an upper part and said plurality of rotary cutting elements being guided in relation at said upper part of said housing;
   (b) said plurality of rotary cutting elements comprise a first group which rotates in one direction and a second group which rotates in the opposite direction; and
   (c) a first part of said plurality of rotary drums surmounts a corresponding one of said rotary cutting elements in the first group and a second part of said plurality of rotary drums surmounts a corresponding one of said rotary cutting elements in the second group.

17. A mower according to claim 16 wherein:
   (a) said at least part of said connecting elements penetrates:
       (i) inside at least one rotary drum of said first part of said plurality of rotary drums by passing through said upper part of said at least one rotary drum of said first part and
       (ii) inside at least one rotary drum of said second part of said plurality of rotary drums by passing through said upper part of said at least one rotary drum of said second part and
   (b) said plurality of rotary push-back blades extending at said upper part of said at least one rotary drum of said first part of said plurality of rotary drums are directed in the direction opposite to said plurality of rotary push-back blades extending at said upper part of said at least one rotary drum of said second part of said plurality of rotary drums.

18. A mower according to claim 17 wherein:
   (a) said at least part of said connecting elements penetrates;
       (i) inside one rotary drum of said first part of said plurality of rotary drums and
       (ii) inside one rotary drum of said second part of said plurality of rotary drums;
   (b) said one rotary drum of said first part of said plurality of rotary drums surmounts the rotary cutting element in the first group extending at one end of said housing; and
   (c) said one rotary drum of said second part of said plurality of rotary drums surmounts the rotary cutting element in the second group extending at the other end of said housing.

19. A mower according to claim 17 wherein:
   (a) at the upper part of said at least one rotary drum of said first and second parts of said plurality of rotary drums is housed a push-back element comprising a collar-shaped flange which is equipped on a face with a plurality of rotary push-back blades sized and shaped to equip said at least one rotary drum rotating in one direction and (b) said collar-shaped flange is equipped on an other face with a plurality of rotary push-back blades sized and shaped to equip said at least one rotary drum rotating in the opposite direction.

20. A mower according to claim 19 wherein said at least one rotary drum of said first and second parts of said plurality of rotary drums has elements which prevent the action of said rotary push-back blades which are not supposed to work.

21. A mower according to claim 20 wherein:
   (a) said elements which prevent the action of said rotary pushback blades which are not supposed to work are upwardly open annular channel members mounted on the upper part of said at least one rotary drum of said first and second parts of said plurality of rotary drums and
   (b) said channel members are sized, shaped, and positioned so that said rotary push-back blades which are not supposed to work are received therein.

22. A mower according to claim 21 wherein a radially outer lip of each one of said channel members extends at least approximately up to the level of said collar-shaped flange of said push-back element.

23. A mower according to claim 17 wherein:
   (a) at the upper part of said at least one rotary drum of said first and second parts of said plurality of rotary drums is housed a push-back element comprising bulges having at least approximately a curvilinear triangular shape a point of each of which is directed outwardly;
   (b) a side of each of said bulges forms a rotary push-back blade working in one direction of rotation; and
   (c) an other side of each of said bulges forms a rotary pushback blade working in the opposite direction of rotation.

24. A mower according to claim 23 wherein portions of a flange extend between said bulges.

25. A mower according to claim 23 wherein:
   (a) each of said bulges has a base and
   (b) said bases of said bulges are contiguous.

26. A mower according to claim 1 wherein:
   (a) said cutting means comprises a cutting bar along which are mounted said cutting tools and two rotary drums;
   (b) a first rotary drum extends at one end of said cutting bar and a second rotary drum extends at an other end of said cutting bar;
   (c) said cutting bar is fastened to said frame by means of said connecting elements, a part at least of which penetrates inside said rotary drums by passing through said upper part of said rotary drums;
   (d) said rotary drums are counterrotating; and
   (e) said plurality of rotary push-back blades mounted on the upper part of said first rotary drum are directed in the direction opposite said plurality of rotary push-back blades mounted on the upper part of said second rotary drum.

27. A mower according to claim 1 wherein said at least one rotary drum has a height at least equal to its largest diameter.

28. A mower comprising:
   (a) a frame;
   (b) connecting elements;
   (c) a cutting means comprising cutting tools and a plurality of rotary drums extending in part at least above said cutting tools, each one of said plurality of rotary drums comprising an upper part, and at least one of said plurality of rotary drums comprising an opening extending from an upper edge of said upper part;

(d) said cutting means being supported by said frame by means of said connecting elements;

(e) a driving device for driving said cutting tools and said plurality of rotary drums;

(f) at least a part of said driving device penetrating inside said at least one of said plurality of rotary drums by passing through said opening of said at least one of said plurality of rotary drums; and (g) a plurality of push-back blades extending at said upper part of said at least one of said plurality of rotary drums, above said opening of said at least one of said plurality of rotary drums, whereby said push-back blades prevent earth and/or plant-debris from penetrating inside said at least one of said plurality of rotary drums by passing through said opening arranged in said upper part of said at least one of said plurality of rotary drums.

29. A mower according to claim 28 wherein said plurality of rotary push-back blades are directed outwardly in the direction opposite the direction of rotation of said at least one of said plurality of rotary drums.

30. A mower according to claim 28 wherein said plurality of rotary push-back blades are fastened to said at least one of said plurality of rotary drums.

31. A mower comprising:
(a) a frame;
(b) connecting elements;
(c) a cutting means comprising cutting tools and a plurality of rotary drums extending in part at least above said cutting tools, each one of said plurality of rotary drums comprising an upper part, and at least one of said plurality of rotary drums comprising an opening extending from an upper edge of said upper part;
(d) said cutting means being supported by said frame by means of said connecting elements;
(e) a driving device for driving said cutting tools and said plurality of rotary drums;
(f) at least a part of said connecting elements penetrating inside said at least one of said plurality of rotary drums by passing through said opening of said at least one of said plurality of rotary drums; and
(g) a plurality of blades extending at said upper part of said at least one of said plurality of rotary drums, above said opening of said at least one of said plurality of rotary drums, said blades creating an outwardly directed current of air to prevent earth and/or plant-debris from penetrating inside said at least one of said plurality of rotary drums by passing through said opening arranged in said upper part of said at least one of said plurality of rotary drums.

32. A mower according to claim 31 wherein said plurality of rotary blades are directed outwardly in the direction opposite the direction of rotation of said at least one of said plurality of rotary drums.

33. A mower according to claim 31 wherein opposite said plurality of rotary blades a plugging flange is mounted.

34. A mower according to claim 33 wherein an outside diameter of said plugging flange is at least approximately equal to an outside diameter swept by said plurality of rotary blades.

35. A mower according to claim 34 wherein an outside edge of said plugging flange is folded downwardly.

36. A mower according to claim 34 wherein said plugging flange has air intake holes therethrough.

37. A mower according to claim 31 wherein said plurality of rotary blades are fastened to said at least one of said plurality of rotary drums.

38. A mower according to claim 31 wherein:
(a) said cutting means includes:
(i) a plurality of rotary cutting elements equipped with said cutting tools and
(ii) a housing which is connected to said frame by means of said connecting elements, said housing having an upper part and said plurality of rotary cutting elements being guided in rotation at said upper part of said housing;
(b) said plurality of rotary cutting elements comprise a first group which rotates in one direction and a second group which rotates in the opposite direction;
(c) a first part of said plurality of rotary drums surmounts a corresponding one of said rotary cutting elements in the first group; and
(d) a second part of said plurality of rotary drums surmounts a corresponding one of said rotary cutting elements in the second group.

39. A mower according to claim 38 wherein:
(a) said at least part of said connecting elements penetrates:
(i) inside at least one rotary drum of said first part of said plurality of rotary drums by passing through said upper part of said at least one rotary drum of said first part and
(ii) inside at least one rotary drum of said second part of said plurality of rotary drums by passing through said upper part of said at least one rotary drum of said second part; and
(b) said plurality of rotary blades extending at said upper part of said at least one rotary drum of said first part of said plurality of rotary drums are directed in the direction opposite to said plurality of rotary blades extending at said upper part of said at least one rotary drum of said second part of said plurality of rotary drums.

40. A mower according to claim 39 wherein:
(a) said at least part of said connecting elements penetrates:
(i) inside one rotary drum of said first part of said plurality of rotary drums and
(ii) inside one rotary drum of said second part of said plurality of rotary drums;
(b) said one rotary drum of said first part of said plurality of rotary drums surmounts the rotary cutting element in the first group extending at one end of said housing; and
(c) said one rotary drum of said second part of said plurality of rotary drums surmounts the rotary cutting element in the second group extending at the other end of said housing.

41. A mower according to claim 31 wherein:
(a) said cutting means comprises a cutting bar along which are mounted said cutting tools and two rotary drums;
(b) a first rotary drum extends at one end of said cutting bar and a second rotary drum extends at an other end of said cutting bar;
(c) said cutting bar is fastened to said frame by means of said connecting elements, a part at least of which penetrates inside said rotary drums by passing through said upper part of said rotary drums;

(d) said rotary drums are counterrotating; and
(e) said plurality of rotary blades mounted on the upper part of said first rotary drum are directed in the direction opposite said plurality of rotary blades mounted on the upper part of said second rotary drum.

42. A mower comprising:
(a) a frame;
(b) connecting elements;
(c) a cutting means comprising cutting tools and a plurality of rotary drums extending in part at least above said cutting tools, each one of said plurality of rotary drums comprising an upper part, and at least one of said plurality of rotary drums comprising an opening extending from an upper edge of said upper part;
(d) said cutting means being supported by said frame by means of said connecting elements;
(e) a driving device for driving said cutting tools and said plurality of rotary drums;
(f) at least a part of said driving device penetrating inside said at least one of said plurality of rotary drums by passing through said opening of said at least one of said plurality of rotary drums; and
(g) a plurality of blades extending at said upper part of said at least one of said plurality of rotary drums, above said opening of said at least one of said plurality of rotary drums, said blades creating an outwardly directed current of air to prevent earth and/or plant-debris from penetrating inside said at least one of said plurality of rotary drums by passing through said opening arranged in said upper part of said at least one of said plurality of rotary drums.

43. A mower according to claim 42 wherein said plurality of rotary blades are directed outwardly in the direction opposite the direction of rotation of said at least one of said plurality of rotary drums.

44. A mower according to claim 42 wherein opposite said plurality of rotary blades a plugging flange is mounted.

45. A mower according to claim 44 wherein an outside diameter of said plugging flange is at least approximately equal to the outside diameter swept by said plurality of rotary blades.

46. A mower according to claim 45 wherein an outside edge of said plugging flange is folded downwardly.

47. A mower according to claim 45 wherein said plugging flange has air intake holes therethrough.

48. A mower according to claim 42 wherein said plurality of rotary blades are fastened to said at least one of said plurality of rotary drums.

49. A mower comprising:
(a) a frame;
(b) connecting elements;
(c) a cutting means comprising cutting tools and a rotary drum extending in part at least above said cutting tools and comprising an upper part, said rotary drum further comprising an opening extending from an upper edge of said upper part;
(d) said cutting means being supported by said frame by means of said connecting elements;
(e) a driving device for driving said cutting tools and said rotary drum;
(f) at least a part of said connecting elements penetrating inside said rotary drum by passing through said opening of said rotary drum; and
(g) a plurality of push-back blades extending at said upper part of said rotary drum, above said opening of said rotary drum, whereby said push-back blades prevent earth and/or plant-debris from penetrating inside said rotary drum by passing through said opening arranged in said upper part of said rotary drum.

50. A mower comprising:
(a) a frame;
(b) connecting elements;
(c) a cutting means comprising cutting tools and a rotary drum extending in part at least above said cutting tools and comprising an upper part, said rotary drum further comprising an opening extending from an upper edge of said upper part;
(d) said cutting means being supported by said frame by means of said connecting elements;
(e) a driving device for driving said cutting tools and said rotary drum;
(f) at least a part of said driving device penetrating inside said rotary drum by passing through said opening of said rotary drum; and
(g) a plurality of push-back blades extending at said upper part of said rotary drum, above said opening of said rotary drum, whereby said push-back blades prevent earth and/or plant-debris from penetrating inside said rotary drum by passing through said opening arranged in said upper part of said rotary drum.

51. A mower comprising:
(a) a frame;
(b) connecting elements;
(c) a cutting means comprising cutting tools and a rotary drum extending in part at least above said cutting tools, and comprising an upper part, said rotary drum further comprising an opening extending from an upper edge of said upper part;
(d) said cutting means being supported by said frame by means of said connecting elements;
(e) a driving device for driving said cutting tools and said rotary drum;
(f) at least a part of said connecting elements penetrating inside said rotary drum by passing through said opening arranged in said upper part of said rotary drum; and
(g) a plurality of blades extending at said upper part of said rotary drum, above said opening of said rotary drum, said blades creating an outwardly directed current of air to prevent earth and/or plant-debris from penetrating inside said rotary drum by passing through said opening arranged in said upper part of said rotary drum.

52. A mower comprising:
(a) a frame;
(b) connecting elements;
(c) a cutting means comprising cutting tools and a rotary drum extending in part at least above said cutting tools and comprising an upper part, said rotary drum further comprising an opening extending from an upper edge of said upper part;
(d) said cutting means being supported by said frame by means of said connecting elements;
(e) a driving device for driving said cutting tools and said rotary drums;
(f) at least a part of said driving device penetrating inside said rotary drum by passing through said opening of said rotary drum; and
(g) a plurality of blades extending at said upper part of said rotary drum, above said opening of said rotary drum, said blades creating an outwardly directed current of air to prevent earth and/or plant-debris from penetrating inside said rotary drum by passing through said opening arranged in said upper part of said rotary drum.

* * * * *